United States Patent [19]

Biel

[11] 4,367,256
[45] Jan. 4, 1983

[54] CLING-WRAP POLYETHYLENE FILM

[75] Inventor: Edward N. Biel, Munster, Ind.

[73] Assignee: Union Carbide Corporation, Danbury, Conn.

[21] Appl. No.: 264,092

[22] Filed: May 15, 1981

[51] Int. Cl.³ .................. B32B 27/00; B32B 27/80
[52] U.S. Cl. ............................... 428/218; 428/516; 428/220; 426/127; 426/416; 525/240
[58] Field of Search ............. 428/516, 500, 336, 218, 428/220; 426/127, 415; 526/90; 525/240

[56] References Cited

U.S. PATENT DOCUMENTS

| 3,088,848 | 5/1963  | Tritsch ........................... 117/122 |
| 3,281,501 | 10/1966 | Coats et al. ..................... 260/897 |
| 3,340,328 | 9/1967  | Brindell et al. .................. 260/897 |
| 3,409,574 | 11/1968 | Gros .............................. 260/23 |
| 3,700,759 | 10/1972 | Breuer et al. ................. 260/897 A |
| 3,888,709 | 6/1975  | Burk ............................... 156/48 |
| 4,011,382 | 3/1977  | Levine ............................ 526/96 |
| 4,205,021 | 5/1980  | Monta et al. .................... 525/240 |

FOREIGN PATENT DOCUMENTS 53-6750 12/1978 Japan ................................. 428/516

Primary Examiner—George F. Lesmes
Assistant Examiner—E. Rollins Buffalow
Attorney, Agent, or Firm—Harrie M. Humphreys; John C. LeFever; Real J. Grandmaison

[57] ABSTRACT

A cling wrap plastic film comprising a mixture of high pressure-low density polyethylene (HPLDPE) and low pressure-low density polyethylene (LPLDPE), in which the LPLDPE is between about 5 and about 16 weight % of the LPLDPE plus HPLDPE total weight.

21 Claims, 2 Drawing Figures

CLING-WRAP POLYETHYLENE FILM

BACKGROUND OF THE INVENTION

1. Field of the Invention

This invention relates to a cling wrap plastic film formed from polyethylene.

2. Description of the Prior Art

Household food wraps may be produced from various polymers including low density polyethylene. The desirable properties of film-type food wraps include the following:

(1) "Cling"—how well the film stays wrapped around food such as sandwiches and adheres to open containers for food such as glass bowls.

(2) High strength characteristics such as tensile strength, puncture resistance and Elmendorf tear.

(3) High stretch capability—how hard the film may be stretched and elongated without breakage.

(4) Good handleability—how well the film resists tangling during use.

(5) "Cutter bar tear"—how readily a length of the film may be withdrawn from a carton and severed by ripping or cutting on the carton's cutter bar.

The cling property is typically enhanced by the use of cling additive in the film. Also, the film-type food wraps are customarily produced in thin gauges such as 0.5 mil in thickness, for economy and to provide a limpness so that the film may conform to the various shapes of packaged or wrapped containers, bowls and foods. With such thin film, toughness becomes a problem and manufacturers of film-type food wraps are constantly seeking to improve this property.

Consumers are also interested in the ease of dispensing and tearing off a sheet of film as it is withdrawn from a container that the film is packaged in. For this purpose, containers such as cartons are ordinarily provided with sharp edges, usually, a saw-tooth edge, known as a "cutter bar". Manufacturers have attempted to comply with this consumer demand by supplying film that can be withdrawn from a container to a desired length and severed along the cutter bar with ease.

With the introduction of "linear" low density polyethylenes made by low pressure processes (hereinafter referred to as "LPLDPE"), attempts have been made to substitute this material for cling wrap film applications in place of conventional highly branched low density polyethylenes made by high pressure processes (hereinafter referred to as "HPLDPE"). The reason for these efforts is that LPLDPE is widely recognized as being tougher and stronger than HPLDPE (reference: "Process Engineering News", February 1980, pg. 33). However, it has been determined that LPLDPE does not provide one of the important properties required in cling wrap plastic films—ease in cutter bar tear off. Even at 0.5 mils thickness, LPLDPE film is very difficult and in some instances impossible to tear off in the transverse direction of the film on conventional cutter bar strips. The film tends to elongate, and considerable effort and energy are required to sever the film.

Accordingly, it is an object of this invention to provide a cling wrap polyethylene film which has high strength, high stretch capability and ease of cutter bar tear off.

This and other objects of the invention will be apparent from the following description, the appended claims, and the drawings in which:

FIG. 1 is a graph showing cutter bar test resistance of 0.5 mil film in energy for the transverse film direction, as a function of the weight percent LPLDPE in the LPLDPE plus HPLDPE total weight, and FIG. 2 is a graph showing cutter bar tear resistance of 0.5 mil film in peak load for the transverse film direction, as a function of the weight percent LPLDPE in the LPLDPE plus HPLDPE total weight.

SUMMARY OF THE INVENTION

In this invention, a cling wrap plastic film is provided comprising a mixture of high pressure-low density polyethylene (HPLDPE) and low pressure-low density polyethylene (LPLDPE), and a cling agent in an amount between about 0.5 and about 2.5 wt.% of the film. The HPLDPE has melt index between about 0.5 and about 7.0 gms/10 minutes, and density below about 0.932 gms/cm$^3$. The LPLDPE has melt index between about 0.5 and about 4.0 gms/10 minutes, and density below about 0.932 gms/cm$^3$. For the single layer embodiment the LPLDPE is present in quantity between about 5 and about 16 wt.% of the LPLDPE plus HPLDPE total weight. For the multiple layer embodiment the LPLDPE is present in quantity between about 5 and about 13 wt.% of the LPLDPE plus HPLDPE total weight. The film thickness is between about 0.3 and about 1.5 mils.

The film of this invention may be in the form of a single layer with LPLDPE and HPLDPE substantially uniformly distributed through the entire film. Alternatively, the film may be in the form of multiple layers with the LPLDPE and HPLDPE substantially uniformly distributed through at least one layer. By way of example, the film may comprise three layers in which the polyethylene content of the outer layers is only HPLDPE and the middle layer has LPLDPE and HPLDPE substantially uniformly distributed therethrough. In this event the LPLDPE must be present in the middle layer in sufficient proportion to satisfy the about 5–13 wt.% of total polyethylene ("PE") in the entire film. Thus, if the three layers are of the same thickness, the LPLDPE in the middle layer must comprise between about 15 wt.% and about 39 wt.% of the total PE content of this layer.

As will be demonstrated by comparative tests discussed hereinafter, the cling wrap film of this invention has substantial improvements in certain strength characteristics compared with prior art 100% HPLDPE cling wrap film, yet far superior cutter bar tear characteristics in comparison to other LPLDPE-HPLDPE mixture cling wrap films with higher HPLDPE concentrations or 100% LPLDPE cling wrap film.

DESCRIPTION OF THE PREFERRED EMBODIMENTS

Figure 1:
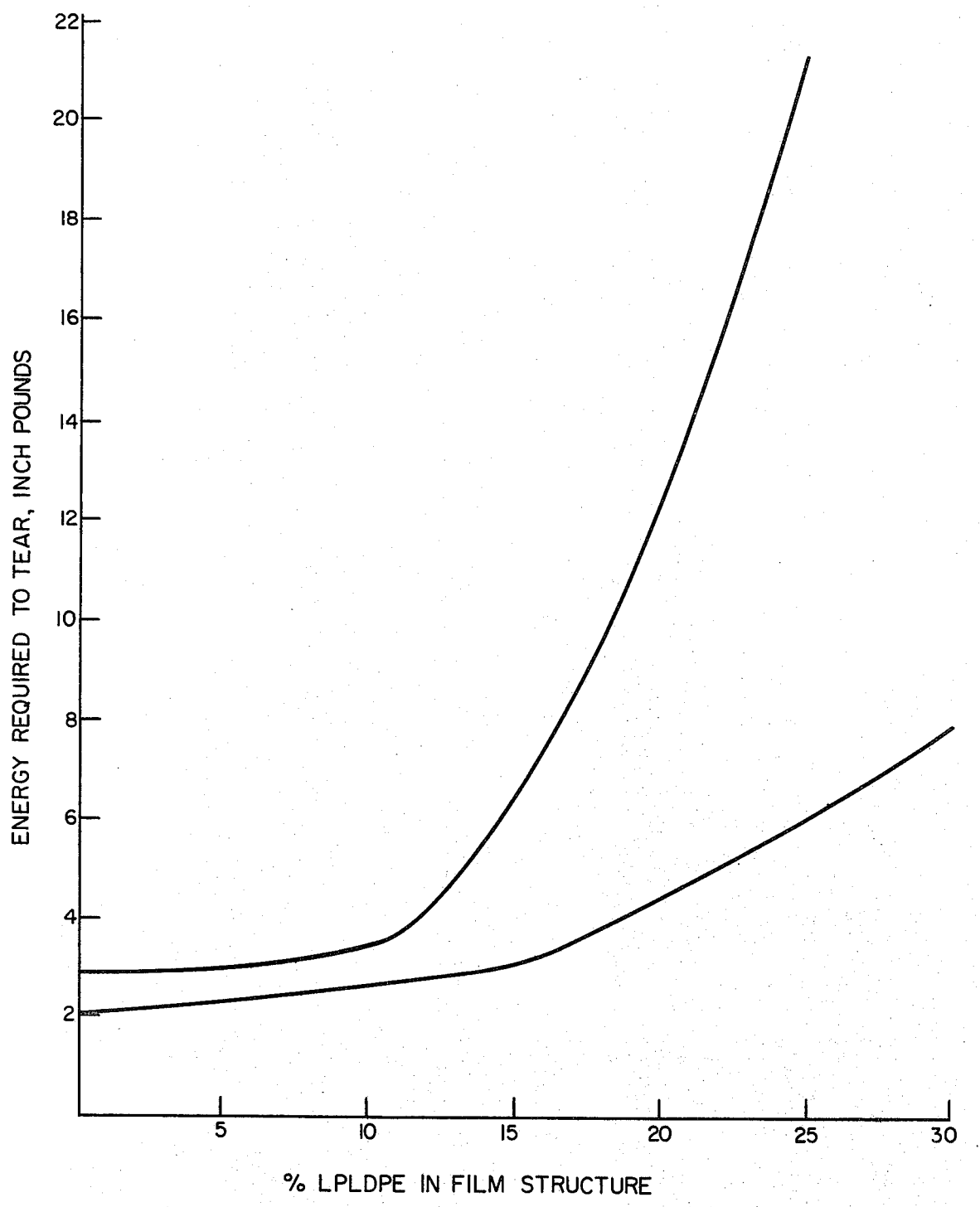

It has been unexpectedly discovered that if the polyethylene cling wrap plastic film contains at least about 5 wt.% LPLDPE and not more than about 16 wt.% LPLDPE of the LPLDPE plus HPLDPE total weight for single layer films or not more than about 13 wt.% LPLDPE for multiple layer films, the resulting film has certain improved strength characteristics as well as improved cutter bar tear characteristics.

It will be recalled that the invention requires use of HPLDPE and LPLDPE each having melt indices of at least about 0.5 gms/10 minutes. Lower values result in HPLDPE-LPLDPE blends which are difficult to extrude at reasonably high production rates because of high viscosity, which reduces extrusion throughput rate. On the other hand, melt indices of both the HPLDPE and the LPLDPE should not exceed about 7.0 and 4.0 respectively, because higher values for either type of polyethylene adversely affect certain physical properties of the resulting film for use as a cling wrap. In particular, the tensile strength and puncture resistance both decline if the melt index of the HPLDPE component exceeds about 7.0 gms/10 minutes or if the melt index of the LPLDPE component exceeds about 4.0 gms/10 minutes.

The invention also requires that the density or densities of both the HPLDPE and LPLDPE be below about 0.932 gms/cm$^3$. Polyethylene of greater than 0.932 density results in HPLDPE-LPLDPE cling films which have poor tear strength in the machine direction. That is, if the film is pulled in the transverse direction it tends to split in the machine direction. The puncture resistance of the cling wrap film also declines if the density of either the HPLDPE or LPLDPE constituent exceeds about 0.932 gms/cm$^3$. In one preferred embodiment the HPLDPE and LPLDPE densities are between about 0.910 and 0.932 gms/cm$^3$. If available, use of polyethylene densities below about 0.910 would probably result in films which are inferior because of less satisfactory cutter bar tear off properties. In general, lower polyethylene densities result in film which, because of easier stretching, is more difficult to separate by cutter bar tear. For this reason and the tendency towards poor MD tear strength with high densities, the LPLDPE is most preferably in the 0.917–0.920 gms/cm$^3$ range and the HPLDPE is preferably in the 0.926–0.929 gms/cm$^3$ range.

The present plastic film requires a cling agent in an amount between about 0.5 and about 2.5 wt.% of the film. Concentrations below about 0.5 wt.% do not provide the film with sufficient cling characteristic. Concentrations above about 2.5 wt.% provide so much lubricant that processing of the blend and film formation are difficult because the lubricant prevents fluxing (melting and mixing) of the resin. There are numerous compounds well-known in the art as providing the cling characteristic in polyethylene films, including the following: glycerol mono or di-oleate, polypropylene glycol, sorbitan mono oleate, mono and diglycerides, fatty esters, mineral oil and vegetable oils. The preferred cling agents are glycerol oleates in concentration between about 0.5 and about 1.5 wt.% of the film, and in particular glycerol mono-oleate and glycerol di-oleate. Mineral oil and vegetable oil in 0.5 wt.% concentration have also been used as cling agents in the polyethylene film of this invention, and the film cling characteristics were satisfactory. Where the polyethylene film is formed in multiple layers, each layer should contain sufficient cling agent to be in the specified wt.% range.

As previously stated, the thickness of polyethylene cling films according to this invention is between about 0.3 and about 1.5 mils. Films of less than about 0.3 mils thickness have insufficient strength and are difficult to handle. Films thicker than about 1.5 mils are also difficult to handle and have excessively high cutter bar tear requirements. A film thickness range between about 0.4 and about 0.6 mils represents a preferred balance of these characteristics.

High pressure low density polyethylene (HPLDPE) has been commercially available for many years and the highly branched homopolymer is made with a free radical catalyst at pressures typically above 15,000 psi, usually in elongated tubular reactors.

Low pressure low density polyethylene (LPLDPE) has only been commercially available for a few years, and is more linear and less chain branched than HPLDPE. LPLDPE is typically made at 150 to 400 psi. in the gas phase, by copolymerizing ethylene as the major constituent and C2-C8 alpha monoolefins as the minor constituent comonomer, with heterogeneous catalysts based on transition metal compounds of variable valence. Methods for manufacturing representative types of LPLDPE are described in Levin U.S. Pat. No. 4,011,382 and European Patent Application No. 79-100958.2. LPLDPE generally possesses little, if any, long chain branching and the only branching to speak of is short chain branching. Branch length is controlled by comonomer type. Branch frequency is controlled by the concentration of comonomer(s) used during copolymerization. Branch frequency distribution is influenced by the nature of the transition metal catalyst used during the copolymerization process.

The LPLDPE density may be controlled by the type of comonomers used to introduce limited branching. These may for example include butene-1, so that the LPLDPE is a copolymer of ethylene and butene-1. As another example, the comonomer may be hexene-1 and either propylene or butene-1, so that the LPLDPE is a terpolymer comprising ethylene, hexene-1 and either propylene or butene-1. The terpolymer type of LPLDPE comonomer is described more completely in European Patent Application No. 0 021 605.

EXAMPLE I

A series of single layer polyethylene cling-type films of 0.50 mil thickness were prepared in laboratory equipment to demonstrate the effect of LPLDPE addition on the film physical properties. In each instance the film included 1.2 wt.% glycerol mono-oleate as a cling additive, and the mixtures were prepared by conventional hot processing in a 25 lb. batch size Banbury-type mixer. The mixtures were then slot cast according to conventional extrusion techniques using a 2½-inch (barrel diameter) machine equipped with a 30-inch slot die.

In this Example I, the HPLDPE melt index was 2.5 and the density was 0.927; the LPLDPE melt index was 1.0 and the density was 0.918. The polyethylene weight compositions of the individual single layer films used in these tests were as follows:

Film A—100% HPLDPE
Film B—15% LPLDPE and 85% HPLDPE
Film C—20% LPLDPE and 80% HPLDPE
Film D—25% LPLDPE and 75% HPLDPE
Film E—30LPLDPE and 70% HPLDPE
Film F—100% LPLDPE

EXAMPLE II

A series of three layer polyethylene cling-type films of 0.50 mil total thickness was prepared to demonstrate the effect of LPLDPE addition on the film physical properties. The films were prepared by conventional hot processing using the Banbury procedure, and slot cast according to conventional extrusion techniques using a 2½-inch (barrel diameter) primary extruder to feed the outer layers of the film and a 2-inch (barrel diameter) satellite extruder to feed the core layer of the film. A 30-inch wide slot die equipped with a laminar flow adapter was used to produce the three layer film.

In each instance the individual layers were of the same thickness and the two outer layers were formed from only HPLDPE, although 1.2 wt.% glycerol mono-oleate was included in all layers as a cling agent. The middle or core layer contained different weight mixtures of LPLDPE and HPLDPE, which in several instances corresponded to the Example I single layer LPLDPE/HPLDPE weight ratios. Also, the melt indexes and densities for the HPLDPE and LPLDPE used in these three layer films were the same as used in the Example I single layer films. The middle layer of the three layer films of this Example II were as follows:

Film G—0% LPLDPE and 100% HPLDPE
Film H—15% LPLDPE and 85% HPLDPE, or 5% LPLDPE in total film
Film I—30% LPLDPE and 70% HPLDPE, or 10% LPLDPE in total film
Film J—45% LPLDPE and 55% HPLDPE, or 15% LPLDPE in total film
Film K—60% LPLDPE and 40% HPLDPE, or 20% LPLDPE in total film.
Film L—75% LPLDPE and 25% HPLDPE, or 25% LPLDPE in total film.

EXAMPLE III

The physical properties of the Example I and II films were measured, and are summarized in Table A. In certain instances, separate measurements were made on two samples which were separately prepared from the same blends and by the same procedure. The duplicate tests are listed in parentheses.

In the examples hereinafter described, the cling characteristic was measured with an instrument (Model 1130) purchased from The Instron Corporation, 2500 Washington St., Canton, Mass. 02021. The overall assembly consisted of a plate made of the food container material to be tested, a clamp which holds one end of an inch wide film specimen, a string which connects the clamp at one end and a 30 gram weight at the other, a metal or glass rod over which the string slides, a ringstand to hold the rod parallel to the Instron crosshead, and a metal plate which allows the test place to be attached to the Instron crosshead. The sample, 9 inches long by one inch wide, is prepared by placing the wrap between two pieces of paper and cutting on a paper cutter.

In the cling test, eight inches of the nine inch long sample is placed on the plate being evaluated. The film is firmly rolled flat onto the plate with a rubber roller. The additional one inch of the sample is clamped in the small steel clamp. The plate is mounted horizontally on the Instron crosshead. A glass or metal rod is held parallel to the plate edge and to the crosshead, five inches from the edge of the plate. The string attached to the clamp holding the sample is hung over the rod. A 30 grams mass is attached to the end of the string. In this position the mass is exerting a force which tries to slide the film over the plate. Generally the coefficient of friction is so great that the film will not slide. The plate and crosshead are raised 2½ inches above the rod. Next the crosshead is lowered at a rate of 20 inches/minute. As the plate drops below the level of the rod, the film begins to peel from the plate. When the film releases completely from the plate, the crosshead is stopped. The distance the plate dropped below the rod in inches is related to the magnitude of adhesive force or cling between the film and the plate.

In these measurements the same Instron apparatus was used for the cutter bar tests, that is, the load and energy required to tear a section of the film were measured on a standard metal cutter bar, i.e. the type used on household cartons. The cutter bar is held in one Instron jaw at a 30-degree angle from the horizontal, and a 5 inch × 14 inch section of film is looped over the cutter bar with the ends of the film held by the other Instron jaw. The Instron crosshead is activated causing the film to be pulled over the cutter bar until severed, and the load (in pounds) and energy (in inch-pounds) to sever the film are measured. Functionally, lower values are desirable so that the film is easy to tear.

TABLE A

PHYSICAL PROPERTIES OF SINGLE AND THREE LAYER FILMS

| SAMPLE | Single Layer | | | | | |
|---|---|---|---|---|---|---|
| | A | B | C | D | E | F |
| TENSILE STRENGTH, LBS/IN. | | | | | | |
| MD | 1.6(1.3) | 1.8(1.6) | 1.8(1.9) | 2.1 | 1.9 | 3.2 |
| TD | 0.9(0.8) | 0.9(0.8) | 0.9(0.8) | 1.0 | 1.1 | 1.9 |
| PUNCTURE | | | | | | |
| LOAD, LBS. | 3.9(3.1) | 4.4(3.4) | 4.9(4.8) | 5.1 | 5.7 | 6.8 |
| ENERGY, IN.-LBS. | 5.5(3.5) | 7.1(4.1) | 7.2(7.3) | 8.8 | 9.0 | 18.0 |
| SPENCER IMPACT, GMS. | 190(150) | 259(192) | 275(310) | 299 | 226 | — |
| ELEMENDORF TEAR, GMS/MIL | | | | | | |
| MD | 163(277) | 135(139) | 130(110) | 116 | 20 | 14 |
| TD | 356(472) | 543(563) | 472(450) | 502 | 543 | 565 |
| ELONGATION, % | | | | | | |
| MD | 200(225) | 236(251) | 214(257) | 292 | 247 | 395 |
| TD | 106(123) | 332(267) | 356(207) | 373 | 336 | 585 |
| CUTTER BAR TEAR | | | | | | |
| PEAK LOAD, LBS. | 1.3(1.6) | 1.5* | 3.7(3.6) | 4.7 | 4.8 | >10 |
| AVG. LOAD, LBS. | 0.6(0.9) | 0.6 | 1.1(1.5) | — | — | — |
| ENERGY, IN.-LBS. | 2.0(2.3) | 2.2 | 4.5(4.8) | 6.3 | 7.2 | >100 |
| CLING TO SELF, IN. | 7.3(6.5) | 7.1(5.7) | 7.0(6.2) | 7.0 | 6.7 | — |
| CLING TO GLASS, IN. | 7.2(6.3) | 7.2(6.0) | 7.1(6.2) | 7.0 | 7.1 | — |
| % LPLDPE | 0 | 15 | 20 | 25 | 30 | 100 |

Three Layer

TABLE A-continued
PHYSICAL PROPERTIES OF SINGLE AND THREE LAYER FILMS

| SAMPLE | G | H | I | J | K | L |
|---|---|---|---|---|---|---|
| TENSILE STRENGTH, LBS/IN. | | | | | | |
| MD | 1.4 | 1.3 | 1.5 | 1.7(2.4) | 1.8 | 1.7 |
| TD | 0.8 | 1.0 | 0.9 | 1.0(1.0) | 0.9 | 1.0 |
| PUNCTURE | | | | | | |
| LOAD, LBS. | 3.4 | 2.7 | 3.9 | 4.3(5.0) | 4.5 | 5.1 |
| ENERGY, IN.-LBS. | 4.9 | 3.5 | 5.6 | 6.4(7.9) | 7.4 | 9.1 |
| SPENCER IMPACT, GMS. | 155 | 125 | 203 | 230(396) | 189 | 189 |
| ELMENDORF TEAR, GMS/MIL | | | | | | |
| MD | 236 | — | 110 | 127(143) | 122 | 81 |
| TD | 540 | 690 | 514 | 627(555) | 624 | 738 |
| ELONGATION, % | | | | | | |
| MD | 221 | 322 | 209 | 256(280) | 223 | 257 |
| TD | 82 | 72 | 125 | 334(264) | 326 | 324 |
| CUTTER BAR TEAR | | | | | | |
| PEAK LOAD, LBS. | 1.9(2.1) | 1.9(1.0) | 2.9 | 4.3(4.6) | 5.0(5.2) | 5.0 |
| AVG. LOAD, LBS. | 1.1(1.0) | 0.5(0.5) | 0.9 | —(2.7) | (1.0) | — |
| ENERGY, IN.-LBS. | 2.9(3.0) | 1.8(1.5) | 3.5 | 6.0(7.1) | 12.6(13.7) | 21.5 |
| CLING TO SELF, IN. | — | 7.3 | 6.8 | 6.8(5.7) | 6.6 | 6.9 |
| CLING TO GLASS, IN. | — | 7.0 | 7.0 | 7.1(5.8) | 7.0 | 7.1 |
| % LPLDPE | 0 | 5 | 10 | 15 | 20 | 25 |

*Three sets of cutter bar measurements were made on samples from the second preparation, as follows:
Peak Load (2.9) (2.0) (2.2),
Ave. Load (1.5) (1.0) 1.1),
Energy (3.9) (2.8) (3.3)

Review of the Table A indicates several unexpected relationships. With respect to tensile strength only, there is no particular advantage in using LPLDPE-HPLDPE blends rather than either pure HPLDPE or pure LPLDPE. On the other hand, the puncture resistance (both load and energy) progressively increases with higher percentages of LPLDPE in the blend. The puncture resistance of 100% LPLDPE is substantially superior to 100% HPLDPE.

Examination of the Spencer impact data reveals that quite unexpectedly the values for the three layer LPLDPE-HPLDPE blended cling wrap films in the range of this invention are superior to blends having higher LPLDPE content. For example, the three layer values for sample J (15 wt.% LPLDPE) are both significantly above the Spencer impact value for sample K (20 wt.% LPLDPE). In contrast, the single layer sample B (15 wt.% LPLDPE) values are lower than for sample C (20 wt.% LPLDPE).

In the Elmendorf tear tests, the single layer film of sample B (15 wt.% LPLDPE) is superior to sample C (20 wt.% LPLDPE) in both the MD and TD directions. This is quite unexpected and the reason(s) for this phenomenon are not understood, particularly since the values continue to decline with higher LPLDPE concentrations in the MD direction but gradually improve in the 30-100% LPLDPE range for the TD direction.

For the three layer films, the Elmendorf tear tests show moderately high values in the LPLDPE/HPLDPE range of this invention although performance was at least as good with higher LPLDPE content.

With respect to elongation, the single layer sample B values (15 wt.% LPLDPE) were approximately equivalent to sample C (20 wt.% LPLDPE). The same was true for the three layer sample I (10 wt.% LPLDPE) as compared with sample J (15 wt.% LPLDPE).

Figure 2:
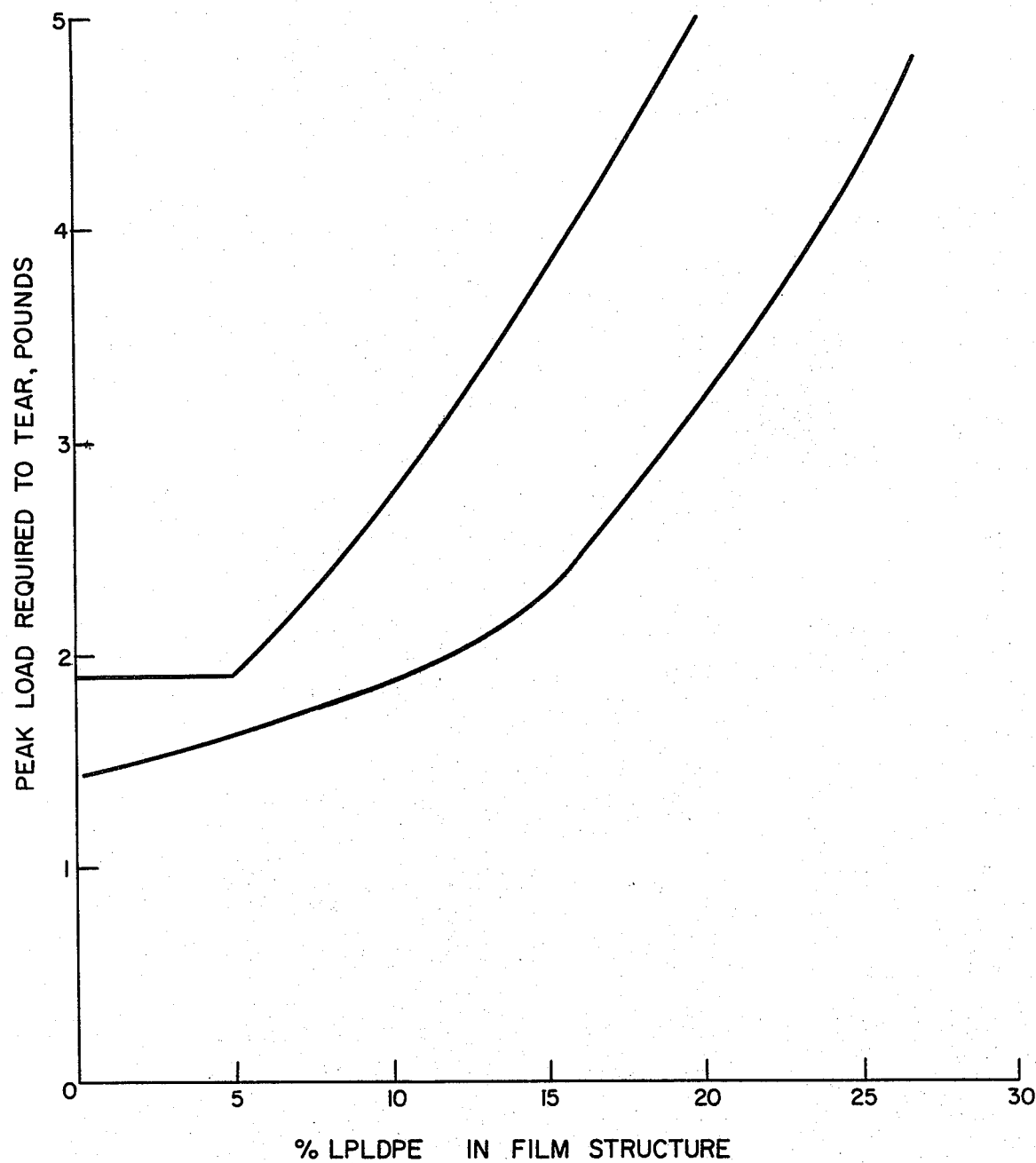

The cutter bar tear data is best understood by reference to FIGS. 1 and 2 where the data is graphed as a function of the percent LPLDPE in the LPLDPE plus HPLDPE total weight. In each instance the lower curve is based on single layer samples A through F, whereas the upper curve is based on samples G through L. The higher the values, the more difficult it is to sever film on a cutter bar.

In FIG. 1, the single layer cutter bar tear resistance energy (inch-pounds) gradually increases with a slightly positive slope to the region of about 16 wt.% LPLDPE, where the slope increases substantially. In FIG. 2, the single layer cutter bar resistance peak load in the transverse direction (pounds) also gradually increases with a moderately positive slope to the region of about 16 wt.% LPLDPE, where the slope increases substantially. These changes-of-slope were unexpected, and the reason(s) for same are not understood. This data supports the upper limit of about 16 wt.% LPLDPE for the single layer embodiment of the invention. The range between about 10 and about 15 wt.% LPLDPE provides an optimum balance of physical properties and represents a preferred embodiment for single layer cling wrap polyethylene films of this invention.

With respect to the three layer film data, FIG. 1 shows that the cutter bar tear resistance energy is fairly flat up to about 10 wt.% LPLDPE, and the slope thereafter progressively increases up to about 13 wt.% LPLDPE. At this level the slope is quite high and remains relatively constant with still higher LPLDPE concentrations at least up to about 25 wt.% LPLDPE. Since the slope is progressively increasing in the range of about 10 to about 13 wt.% LPLDPE, the latter supports the upper limit for the multiple layer cling wrap plastic film of this invention. The FIG. 2 graph shows that the cutter bar peak load for the three layer film begins to increase at about 5 wt.% LPLDPE and reaches a constant, relatively high slope at about 9 wt.% LPLDPE. For these reasons, the range between about 5 and 9 wt.% LPLDPE represents an optimum balance of physical properties and represents a preferred embodiment for multiple layer cling wrap polyethylene films of this invention.

A preferred three layer cling wrap film of this invention has the LPLDPE and the HPLDPE substantially uniformly distributed through only the middle layer with between about 15 and about 39 wt.% of the LPLDPE plus HPLDPE total weight, most preferably about 35 wt.% LPLDPE. Each of the three layers has about the same thickness.

Although preferred embodiments of this invention have been described in detail, it is contemplated that modifications thereof may be made and that some features may be employed without others, all within the spirit and scope of the invention. For example, although the films described in the foregoing examples were prepared by slot cast extrusion, other preparative methods may be used as, for example, annular extrusion in a blown film operation.

What is claimed is:

1. A cling wrap plastic film comprising: a mixture of high pressure-low density polyethylene (HPLDPE), low pressure-low density polyethylene (LPLDPE), and a cling agent in amount between about 0.5 and about 2.5 wt.% of said film, wherein said HPLDPE has melt index between about 0.5 and about 7.0 gms/10 minutes and density less than about 0.932 gms/cm$^3$, said LPLDPE has melt index between between about 0.5 and 4.0 gms/10 minutes and density less than about 0.932 gms/cm$^3$, said LPLDPE is between about 5 and about 16 wt.% of the LPLDPE plus HPLDPE total weight for single layer films but between about 5 and about 13 wt.% of the LPLDPE plus HPLDPE total weight for multiple layer films, and the film thickness is between about 0.3 and about 1.5 mils.

2. A cling wrap plastic film according to claim 1, in which said film is a single layer and said LPLDPE and said HPLDPE are substantially uniformly distributed through the entire film.

3. A cling wrap plastic film according to claim 1, in which said film is in the form of multiple layers, and said LPLDPE and said HPLDPE are substantially uniformly distributed through at least one layer of said film.

4. A cling wrap plastic film according to claim 1, in which said film is in the form of three layers, said LPLDPE and said HPLDPE are substantially uniformly distributed through only the middle layer of said film, and the polyethylene content of the outer layers is only HPLDPE.

5. A cling wrap plastic film according to claim 4, in which the polyethylene in the outer layers is only HPLDPE, the middle layer LPLDPE comprises between about 15 and about 39 wt.% of the LPLDPE plus HPLDPE total weight in said middle layer, and each of the three layers has about the same thickness.

6. A cling wrap plastic film according to claim 5, in which said middle layer LPLDPE comprises about 35 wt.% of the LPLDPE plus HPLDPE total weight in said middle layer.

7. A cling wrap plastic film according to claim 1, in which said film is in the form of three layers, and said LPLDPE and said HPLDPE are substantially uniformly distributed through each layer of said film.

8. A cling wrap plastic film according to claim 1, in which said film is a single layer and said LPLDPE is between about 10 and about 15 wt.% of the LPLDPE plus HPLDPE total weight.

9. A cling wrap plastic film according to claim 1, in which said film is in the form of three layers and said LPLDPE is between about 5 and 9 wt.% of the LPLDPE plus HPLDPE total weight.

10. A cling wrap plastic film according to claim 1, in which said cling agent is a glycerol oleate and comprises between about 0.5 and about 1.5 wt.% of said film.

11. A cling wrap plastic film according to claim 10, in which said cling agent is glycerol mono-oleate.

12. A cling wrap plastic film according to claim 10, in which said cling agent is glycerol di-oleate.

13. A cling wrap plastic film according to claim 1, in which said HPLDPE has melt index of about 2.5 gms/10 minutes and density of about 0.927 gms/cm$^3$.

14. A cling wrap plastic film according to claim 1, in which said LPLDPE has melt index of about 1.0 gms/10 minutes and density of about 0.918 gms/cm$^3$.

15. A cling wrap plastic film according to claim 1, in which said HPLDPE has melt index of about 2.5 gms/10 minutes and density of about 0.927 gms/cm$^3$, and said LPLDPE has melt index of about 1.0 gms/10 minutes and density of about 0.918 gms/cm$^3$.

16. A cling wrap plastic film according to claim 1, in which said LPLDPE is a copolymer of ethylene and butene-1.

17. A cling wrap plastic film according to claim 1, in which said LPLDPE is a terpolymer comprising ethylene, hexene-1, and either propylene or butene-1.

18. A cling wrap plastic film according to claim 1, in which the film thickness is between about 0.4 and about 0.6 mils.

19. A cling wrap plastic film according to claim 1, in which the density of said HPLDPE and the density of said LPLDPE are both between about 0.910 and about 0.932 gms/cm$^3$.

20. A cling wrap plastic film according to claim 1, in which the density of said LPLDPE is between about 0.917 and about 0.920 gms/cm$^3$.

21. A cling wrap plastic film according to claim 1, in which the density of said HPLDPE is between about 0.926 and about 0.929 gms/cm$^3$.

* * * * *